(12) United States Patent
Beyene et al.

(10) Patent No.: US 11,943,705 B2
(45) Date of Patent: Mar. 26, 2024

(54) RF (RADIO FREQUENCY) VIRTUALIZATION ARCHITECTURE

(71) Applicant: Skylo Technologies, Inc., Palo Alto, CA (US)

(72) Inventors: Yihenew Dagne Beyene, Espoo (FI); Andrew Nuttall, Mountain View, CA (US); Meghna Agrawal, Cupertino, CA (US); Keijo Tapio Lehtinen, Espoo (FI)

(73) Assignee: Skylo Technologies, Inc., Palo Alto, CA (US)

( * ) Notice: Subject to any disclaimer, the term of this patent is extended or adjusted under 35 U.S.C. 154(b) by 349 days.

(21) Appl. No.: 17/345,810

(22) Filed: Jun. 11, 2021

(65) Prior Publication Data

US 2022/0400429 A1 Dec. 15, 2022

(51) Int. Cl.
*H04W 48/18* (2009.01)
*G06F 9/455* (2018.01)
*H04W 4/02* (2018.01)
*H04W 24/02* (2009.01)
*H04W 72/51* (2023.01)

(52) U.S. Cl.
CPC ........ *H04W 48/18* (2013.01); *G06F 9/45558* (2013.01); *H04W 4/023* (2013.01); *H04W 24/02* (2013.01); *H04W 72/51* (2023.01); *G06F 2009/45595* (2013.01)

(58) Field of Classification Search
CPC ..... H04W 48/18; H04W 72/51; H04W 4/023; H04W 24/02; G06F 9/45558; G06F 2009/45595
See application file for complete search history.

(56) References Cited

U.S. PATENT DOCUMENTS

| 8,781,469 | B2 | 7/2014 | Chen | |
|---|---|---|---|---|
| 8,838,102 | B2 | 9/2014 | Kazmi et al. | |
| 8,897,802 | B2 | 11/2014 | Meredith et al. | |
| 9,020,507 | B2 | 4/2015 | Warken et al. | |
| 2003/0031265 | A1* | 2/2003 | Friedman | ........... H04B 7/18513 375/260 |
| 2004/0096222 | A1* | 5/2004 | Cagenius | ......... H04B 10/25755 398/115 |

(Continued)

FOREIGN PATENT DOCUMENTS

WO WO-2023051891 A1 * 4/2023

*Primary Examiner* — Joseph E Avellino
*Assistant Examiner* — Charles E Eckholdt
(74) *Attorney, Agent, or Firm* — Brian R. Short

(57) ABSTRACT

Apparatuses, methods, and systems for a radio frequency (RF) virtualization system are disclosed. One system includes a plurality of radios, an abstraction layer network, and a controller. The controller operates to receive a standard set of interfaces and capabilities from a plurality of radios through the abstraction layer network, wherein the abstraction layer provides an interface to connect the radio access technology to a corresponding one of the plurality of radios, receive a request from the radio access technology for a radio of the plurality of radios, and allocate and connect a one of a plurality of radios that satisfies specifications of the request of the radio access technology, wherein the one of the plurality of radios that is allocated and connected to the radio access technology changes over time.

18 Claims, 7 Drawing Sheets

(56) References Cited

U.S. PATENT DOCUMENTS

| | | | |
|---|---|---|---|
| 2013/0170389 A1* | 7/2013 | Jee | H04W 36/0085 |
| | | | 370/332 |
| 2015/0036664 A1* | 2/2015 | Yuk | H04W 36/0069 |
| | | | 370/332 |
| 2015/0045051 A1 | 2/2015 | Meredith et al. | |
| 2015/0382224 A1 | 12/2015 | Himayat et al. | |
| 2016/0227560 A1* | 8/2016 | Webb | H04W 72/569 |
| 2016/0262179 A1* | 9/2016 | Choi | H04W 74/00 |
| 2017/0311183 A1* | 10/2017 | Cotanis | H04L 47/11 |
| 2018/0310322 A1* | 10/2018 | Zhang | H04B 7/0617 |
| 2022/0338293 A1* | 10/2022 | Yu | H04L 27/2605 |
| 2022/0400429 A1* | 12/2022 | Beyene | G06F 9/45558 |
| 2023/0292273 A1* | 9/2023 | Zhang | H04W 56/0045 |

\* cited by examiner

RF (RADIO FREQUENCY) VIRTUALIZATION ARCHITECTURE

FIELD OF THE DESCRIBED EMBODIMENTS

The described embodiments relate generally to wireless communications. More particularly, the described embodiments relate to systems, methods. and apparatuses for a radio frequency (RF) virtualization architecture.

BACKGROUND

It is desirable to have methods, apparatuses, and systems for a radio frequency (RF) virtualization architecture.

SUMMARY

An embodiment includes a method of a radio frequency (RF) virtualization architecture. The method includes receiving, by a controller, a standard set of interfaces and capabilities from a plurality of radios through an abstraction layer, wherein the abstraction layer provides an interface to connect a radio access technology to a corresponding one of the plurality of radios, receiving, by the controller, a request from the radio access technology for a radio of the plurality of radios, and allocating and connecting, by the controller, a one of a plurality of radios that satisfies specifications of the request of the radio access technology, wherein the one of the plurality of radios that is allocated and connected to the radio access technology changes over time.

Another embodiment includes a radio frequency (RF) virtualization system. The system includes a radio access technology, a plurality of radios, an abstraction layer network, and a controller. The controller operates to receive a standard set of interfaces and capabilities from a plurality of radios through the abstraction layer network, wherein the abstraction layer provides an interface to connect the radio access technology to a corresponding one of the plurality of radios, receive a request from the radio access technology for a radio of the plurality of radios, and allocate and connect a one of a plurality of radios that satisfies specifications of the request of the radio access technology, wherein the one of the plurality of radios that is allocated and connected to the radio access technology changes over time.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for a radio frequency (RF) virtualization architecture.

Figure 1:
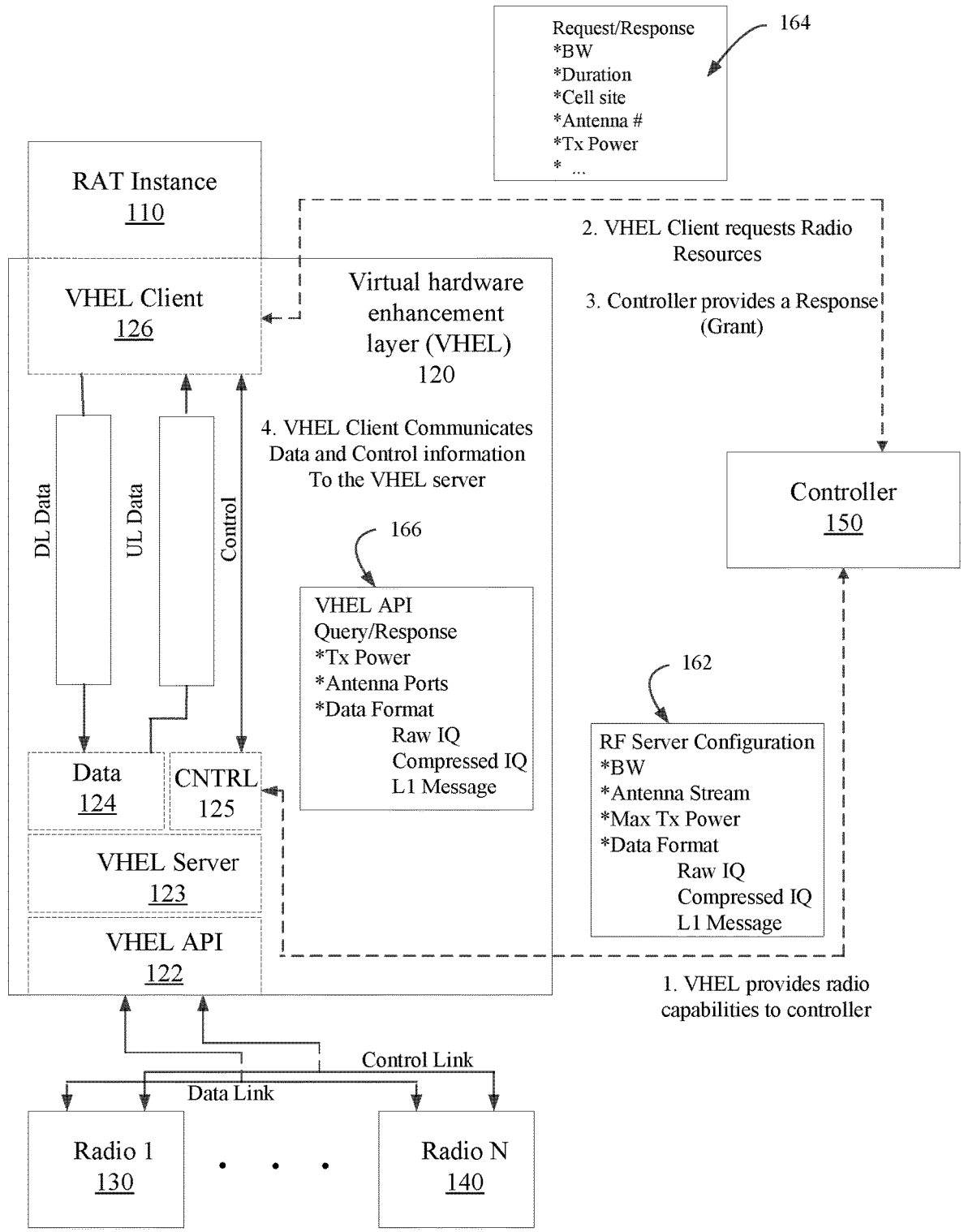
FIG. 1 shows a block diagram of a radio frequency (RF) virtualization architecture of a radio access technology (RAT) and multiple radios, according to an embodiment.

FIG. 1 shows a block diagram of a radio frequency (RF) virtualization architecture of a radio access technology (RAT) 110 and multiple radios 130, 140, according to an embodiment. The radio access technology (RAT) 110 interfaces with a virtual hardware enhancement layer (VHEL) 120, allowing the RAT 110 to utilize at least one of a plurality of radios 130, 140 for wireless communication.

The RAT 110 is an underlying physical connection method for a radio-based communication network. Many modern mobile devices support several RATs in one device such as Bluetooth, Wi-Fi, and GSM, UMTS, LTE or 5G NR.

The radios 130, 140 are elements that radiate (when transmitting) a signal generated from radio access technologies (RATs) and often include baseband converters, amplifiers, other RF frontend elements, and antennas. In many mobile devices, multiple RATs may share a single radio, as is commonly found with Bluetooth and Wi-Fi.

The VHEL 120 is an abstraction layer that facilitates interfacing the RAT 110 with the radios 130, 140 over time. For an embodiment, the VHEL 120 pairs a standard set of control interfaces to the specific capabilities of a selected radio in which the control interfaces of the VHEL manage control, configuration, and data transfer of the RAT/radio system.

RF virtualization refers to the abstraction of RF and associated baseband/IF signal processing chain from the Radio Access Technology (RAT) protocol stack. RF virtualization allows for improved software defined radio and RF operations that are leveraged by the VHEL 120.

Furthermore, RF virtualization converges several similar or different radios 130, 140, which may be co-located or geographically distributed, into one virtual pool of resources (time, frequency, space, code, power . . . ) which can be shared by one or more RAT systems (such as, RAT 110).

For an embodiment, the RF virtualization architecture is designed to work with several types of RF units through the adaptation layer, or VHEL 120 (virtual hardware enhancement layer). The VHEL 120 is an abstraction layer which defines common APIs (application program interfaces) needed to be used by the controller 150 and a BB (baseband) unit of the RAT 110 to interact with the RF subsystem (radios 130, 140). The controller 150 works with any plug-in (a plugin is a software component of the VHEL 120 on the side of the radio which can be located inside the radio or the VHEL API that connects the specific hardware features of the radio to the VHEL standard APIs) which implements VHEL APIs. Plug-ins hide hardware drivers and their internal communication protocol from the RF server. This way different radios (such as SDRs (Software Defined Radios), eCPRI (enhanced common public radio interface) radios or other radios) work together seamlessly.

An embodiment includes a controller 150 receiving a standard set of interfaces and capabilities from a plurality of radios 130, 140 through the abstraction layer (VHEL 120), wherein the abstraction layer (VHEL 120) provides an interface to connect the radio access technology (RAT 110) to a corresponding one of the plurality of radios 130, 140. For an embodiment, a CNTRL (control) 125 of the VHEL 120 provides (step 1 of FIG. 1) the controller 150 with radio capabilities 162. That is, each of the radios 130, 140 have varying radio wireless communication capabilities, such as, a wireless communication transmit power, a wireless communication bandwidth, a wireless communication transmission frequency, coverage area, location, allowed transmit/receive times, etc. As stated, these capabilities are provided to the controller 150. The radio capabilities 162 are used by the controller 150 to aid in matching the available radio capabilities with radio capabilities desired, needed, or required by the RAT 110.

An embodiment includes the controller 150 receiving a request from the radio access technology (RAT 110) for a radio of the plurality of radios (130, 140). Additional request can be made over time, such as, on a per frame basis, wherein each frame defines a structure of the wireless communication of the RAT 110. For an embodiment, a VHEL client 126 provides (step 2 of FIG. 1) the controller 150 with radio resources 164 requested by the RAT 110. For an embodiment, the VHEL client 126 is an adaption layer connecting the bespoke RAT capabilities to standard VHEL interfaces that can connect to the controller 150. The request can include, for example, a requested bandwidth, duration, start time, cell site, a number of antennas, a transmission power, etc.

For an embodiment, the controller 150, allocates and connects a one of a plurality of radios that satisfies specifications of the request of the radio access technology (RAT 110) as a function of time (for example, a per frame basis). Based on the radio capabilities provided to the controller 150, the controller 150 responds to the radio resources request of the VHEL client 126. The response includes a grant (step 3 of FIG. 1) that authorizes the RAT 110 to initiate a data connection with the assigned radio and to update the configuration of the radio based upon the authorized grant.

The VHEL client 126 then communicates data and control information 166 to a VHEL server 123 through a data interface 124 and the CNTRL 125 interface (step 4 of FIG. 1). The VHEL server 123 manages the routing and configuration of pairing RATs to radios. For example, the VHEL server 123 can be responsible for multiplexing requests from multiple RATs to a single radio.

The VHEL API 122 provides an interface between the VHEL server 123 and the radios 130, 140 through a data link and a control link. For an embodiment, the VHEL API 122 connects standard control interfaces to the capabilities of the radio enabled through the radio plugin. The VHEL API 122 may provide an interface to send and receive I/Q samples, control the RF gain of the transmitters, or steer the antenna to a different coverage area.

Figure 2:
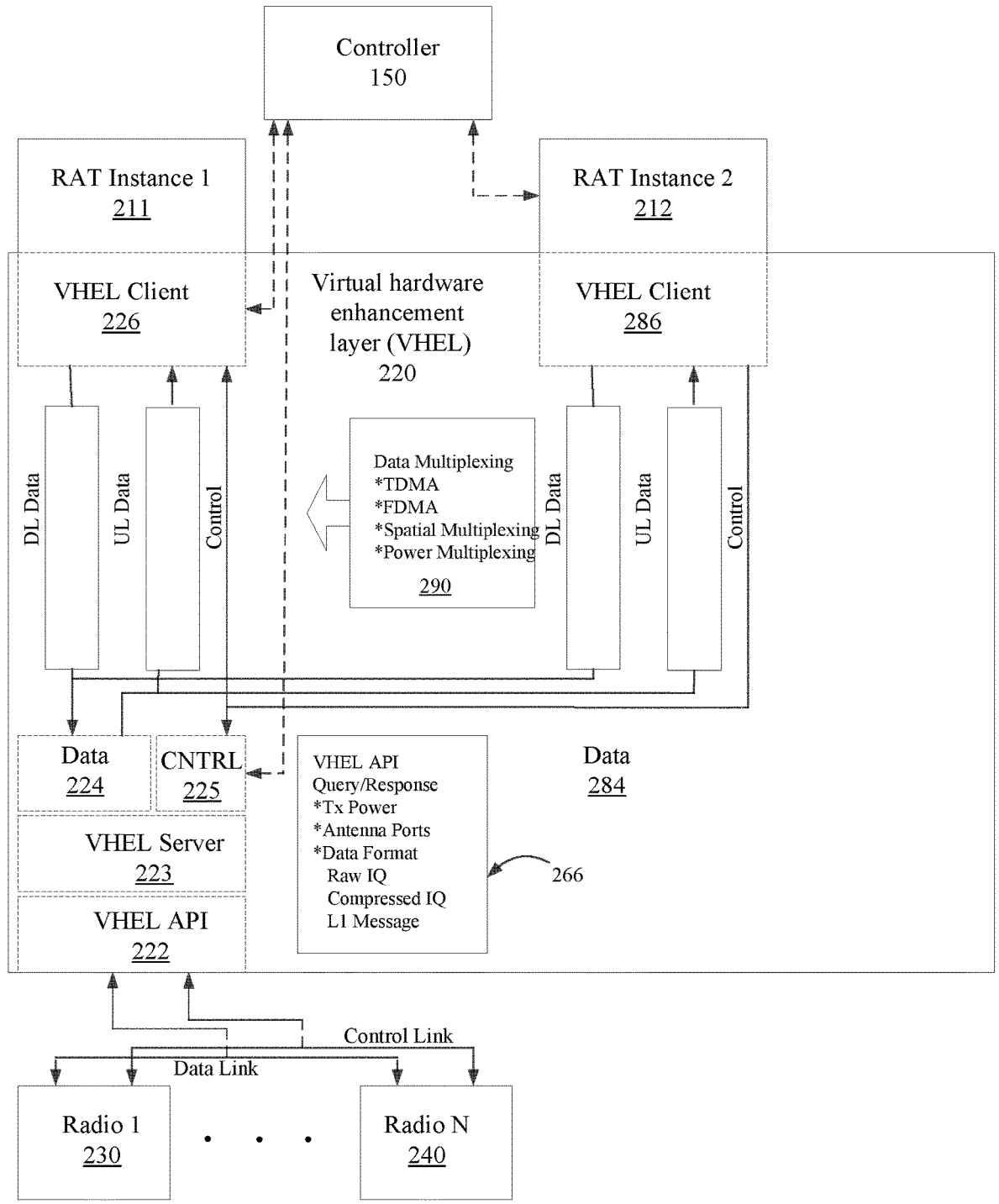
FIG. 2 shows a block diagram of a radio frequency (RF) virtualization architecture of multiple radio access technologies (RATs) and multiple radios, according to another embodiment.

FIG. 2 shows a block diagram of a radio frequency (RF) virtualization architecture of multiple radio access technologies (RATs) 210, 212, and multiple radios 230, 240, according to another embodiment. For this embodiment, the VHEL 220 provides an interface to connect the radio access technologies (RAT 211, RAT 212) to a corresponding one of the plurality of radios 230, 240.

For an embodiment, the multiple RATs 210, 212 (VHEL clients 226, 286) send their granted (authorized) data and control requests (control information 266) to the Data 224 interface and the CNTRL 225 interface of the VHEL 220. The VHEL server 223 then routes the requests to the correct radio API and multiplexes the data and configuration requests when the RATs 210, 212 share a radio. The VHEL API 222 provides an interface between the VHEL server 223 and the radios 230, 240 through a data link and a control link.

For an embodiment, when the RATs 210, 212 share a radio, the VHEL server 223 multiplexes the data and configuration requests. The multiplexing of the shared radio with the multiple RATs 210, 212 can be facilitated through one or more of various multiplexing configurations 290, such as, frequency division multiple access (FDMA), time division multiple access (TDMA), space division multiple access (SDMA, and/or power division multiple access (PDMA).

Figure 3:
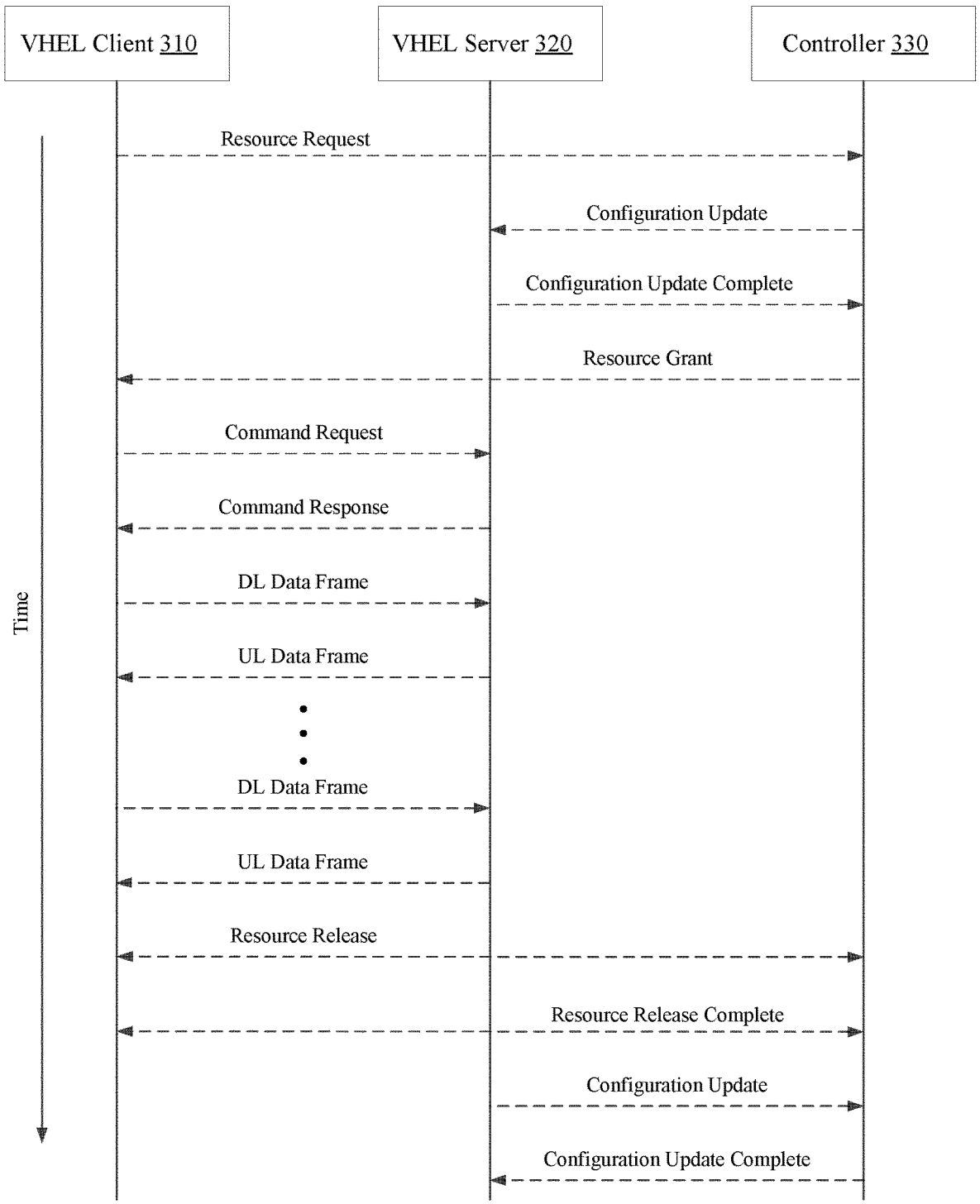
FIG. 3 shows a timing diagram of communication between a virtual client, a virtual server, and a controller, according to an embodiment.

FIG. 3 shows a timing diagram of communication between a virtual client, a virtual server, and a controller, according to an embodiment. For an embodiment, the communication initially starts with the VHEL client 310 submitting a resource request to the controller 330. The controller 330 initiates a configuration update to the VHEL server 320 which includes a request for updated configurations of the radios available for use by the RAT(s). The VHEL server 320 responds with a complete configuration update that provides the control 330 with the current configuration of the available radios.

Based on the current configuration and the resource request, the controller 330 provides the VHEL client 310 with a resource grant which provides the VHEL client 310 with the resources available to the VHEL client 310.

The VHEL client 310 submits a command request to the VHEL server 320, and the VHEL server 320 responds with a command response. For an embodiment, the command request contains the request to send or receive data, or the command request contains a request to update the configuration of the radio. For an embodiment, the command response contains the response code to the request which may include, acknowledgement, timeout, error or other control information.

DL data frames and UL data frames are then exchanged between the VHEL client 310 and the VHEL server 320 as downlink and uplink communication through the radio(s) is performed. For an embodiment, the VHEL server synchronizes the timing of transmit and receive frames between disparate radios (due to different RF path lengths) to provide frame continuity and ordering for the RAT. That is, frames of data may be provided to the VHEL server from one or more radio access technologies (RATs) in which the data is organized within each successive frame of data. However, as described, different radios may be used to transmit the frames of data over time. The different radios have different propagation channels that have varying transmission propagation delays. Accordingly, the reception of data by the different radios can vary as the propagation delays through the different propagation channels varies. As described, for an embodiment, the VHEL server re-synchronizes the data received back from the different radios over time. The re-synchronized receive data is organized back into data frames that the RAT(s) are able to process.

After the DL and UL communication has been performed, either the VHEL client 310 or the controller 330 initiates a resource release, which is followed by a resource release complete by the other of the VHEL client 310 or the controller 330. The released resource is then returned to the pool of controller 330 allocatable resources.

The controller 330 can then be updated with the current configuration of the available radio(s) through another exchange of configuration update and configuration update complete.

Figure 4:
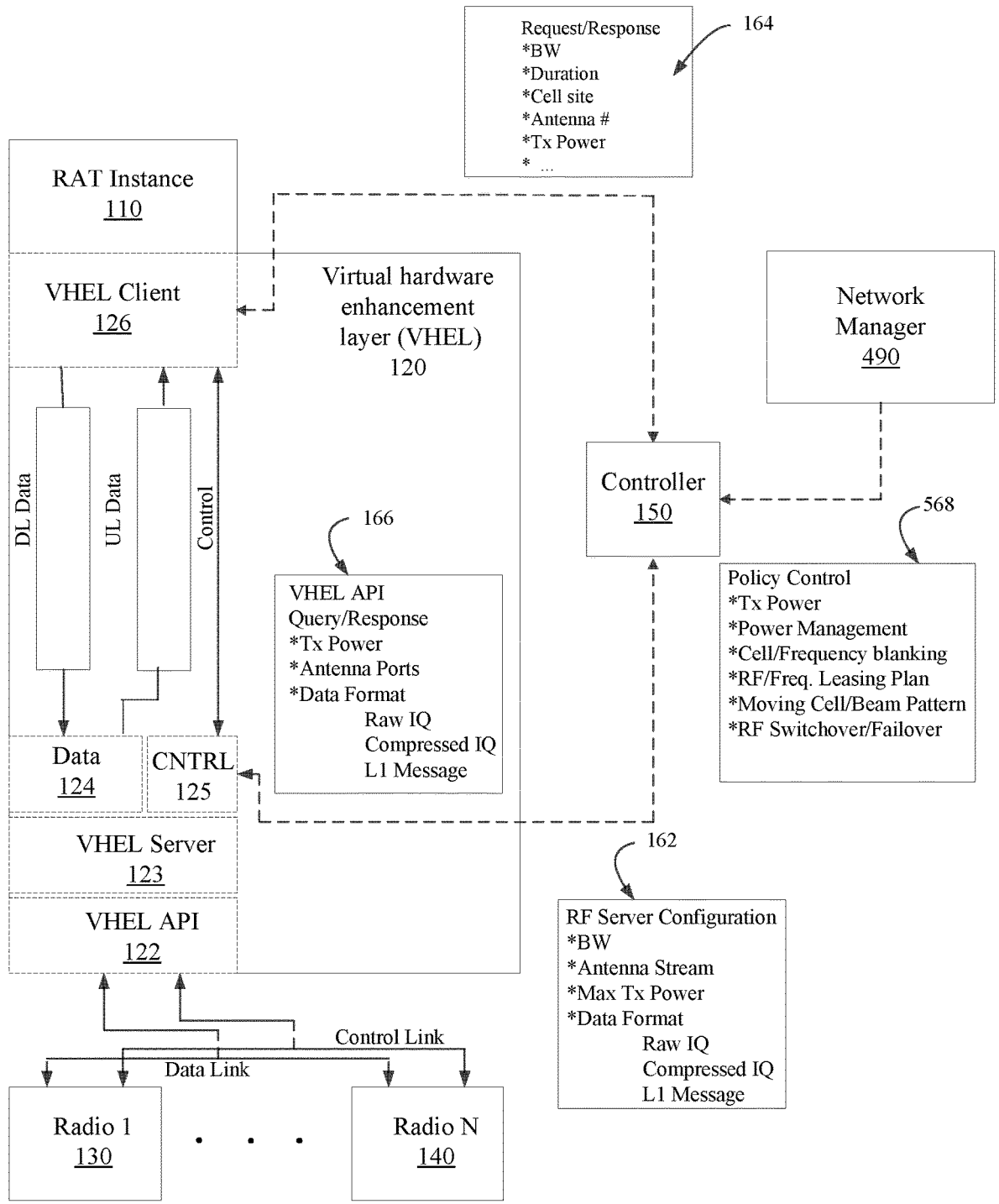
FIG. 4 shows a block diagram of a radio frequency (RF) virtualization architecture of a radio access technology (RAT) and multiple radios that further includes a network management controller providing policy control, according to an embodiment.

FIG. 4 shows a block diagram of a radio frequency (RF) virtualization architecture of a radio access technology (RAT) and multiple radios that further includes a network management controller 490 providing policy control 568, according to an embodiment. For an embodiment, the network management control 490 provides the controller 150 policies 568 that further control operation of the radios 130, 140. The policies 568 can influence the grants provided by the controller 150 to the RAT 110.

For different embodiments, the policies can be static, or change as a function of time. For different embodiments, the policies can be adapted or changed as a function of network performance or loading characteristics. For example, for an embodiment, a policy can define the maximum configurable transmit power from a radio as a function of location or time. For an embodiment, a policy may define the allocable frequency bands over a location of the wireless device that is communicating with one of more of the radios. For an embodiment, a policy may throttle (adjust), or limit RAT allocation of radios based upon current network traffic, RAT priority, and/or RAT radio resource usage. For an embodiment, the policy may define the required link margin/SNR/BER and enforce a desired link margin through MCS selection, radio selection and radio configuration.

Figure 5:
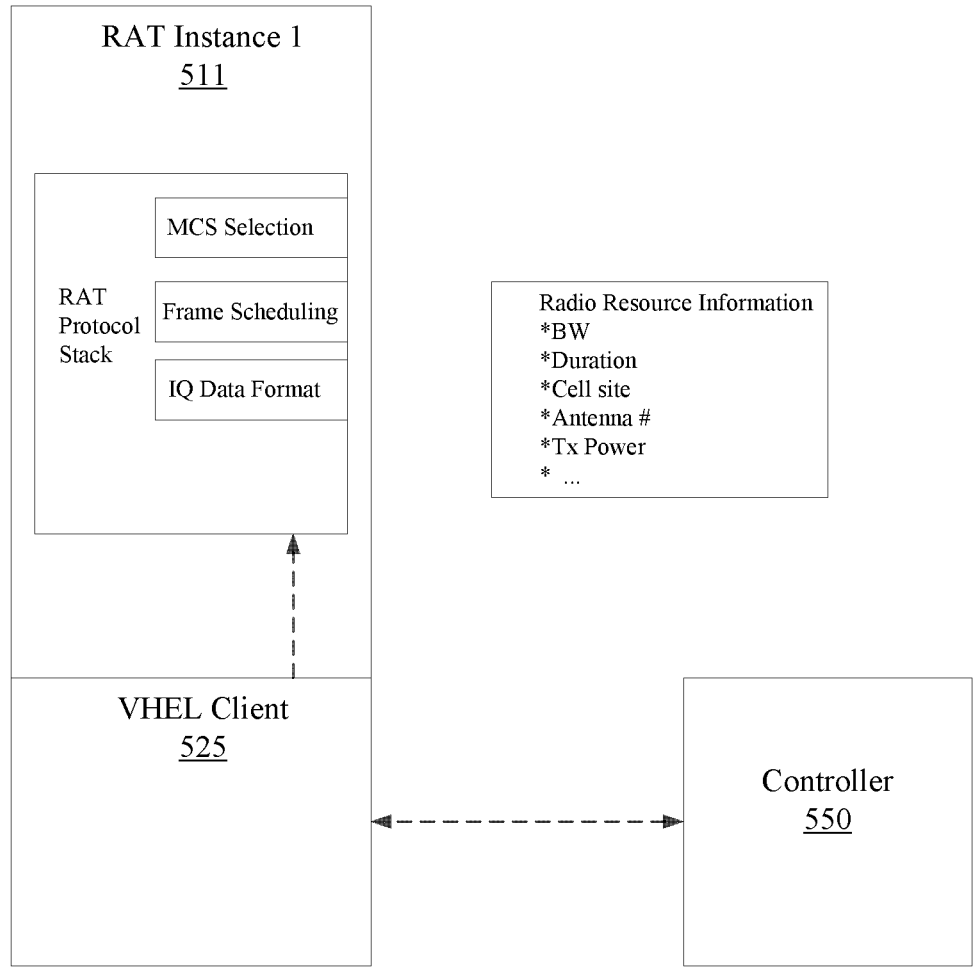
FIG. 5 shows a radio access technology (RAT) 611 performing operating selections and configuration management based on a response received from a controller 550, according to an embodiment.

FIG. 5 shows a radio access technology (RAT) 511 performing operating selections and configuration management based on a response received from a controller 550, according to an embodiment. For an embodiment, the RAT 511 selects an MCS (modulation and coding scheme) of wireless communication utilizing a selected radio based on the response of the controller 550. For an embodiment, the RAT 511 selects frame scheduling of wireless communication utilizing a selected radio based on the response of the controller 550. For an embodiment, the RAT 511 selects an IQ data format of wireless communication utilizing a selected radio based on the response of the controller 550. As previously described, the RAT 511 has an associated VHEL client 525 that interfaces with the controller 550.

For an embodiment, a wireless system must maintain a prescribed bit error rate. However, the allocated radio from the controller 550 may not be capable of transmitting at the required output power. Therefore, for an embodiment, the RAT 511 updates its MCS configuration based upon the controller 550 response to ensure the prescribed bit error rate is maintained.

Figure 6:
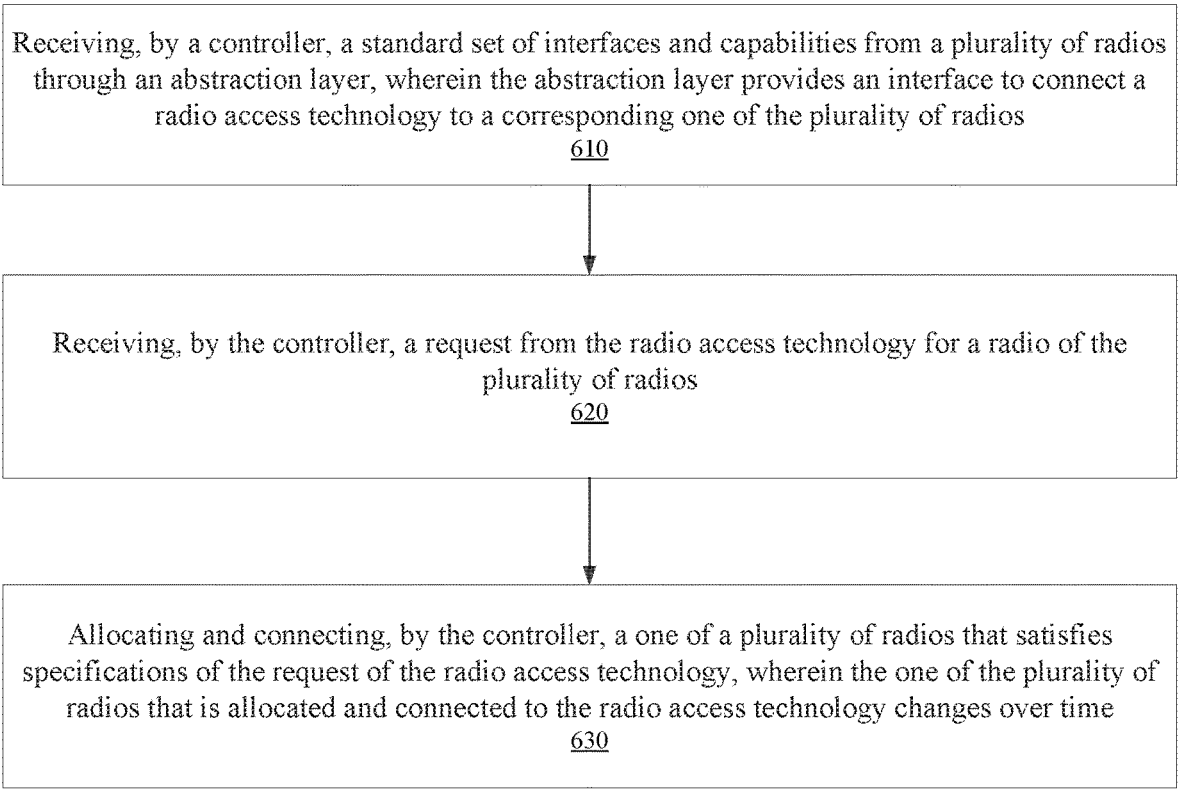
FIG. 6 is a flow chart that includes steps of a method of operating a radio frequency (RF) virtualization architecture, according to an embodiment.

FIG. 6 is a flow chart that includes steps of a method of operating a radio frequency (RF) virtualization architecture, according to an embodiment. A first step 610 includes receiving, by a controller, a standard set of interfaces and capabilities from a plurality of radios through an abstraction layer, wherein the abstraction layer provides an interface to connect a radio access technology to a corresponding one of the plurality of radios. A second step 620 includes receiving, by the controller, a request from the radio access technology for a radio of the plurality of radios. A third step 630 includes allocating and connecting, by the controller, a one of a plurality of radios that satisfies specifications of the request of the radio access technology, wherein the one of the plurality of radios that is allocated and connected to the radio access technology changes over time.

For an embodiment, the request from the radio access technology for the radio of the plurality of radios occurs as frequently as once per frame, wherein the frame is defined by a frame structure of wireless communication transmitted and received by the plurality of radios. For an embodiment, the allocating and connecting, by the controller, the one of a plurality of radios that satisfies specifications of the request of the radio access technology changes from one frame to a next frame. The changes do not need to occur from one frame to the next but can occur as frequently as from one frame to another. For an embodiment, the radio access technology changes over time such that the changes are aligned with the RAT protocol framing structure.

For an embodiment, the controller sets a configuration of the plurality of radios. For a least some embodiments, the configuration of the radio includes one or more of a maximum transmit power, bandwidth, etc.

For at least some embodiments, the controller receives the request from the radio access technology for the radio of the plurality of radios from a VHEL (virtual hardware enhancement layer) client of the abstraction layer. For an embodiment, the VHEL client adapts an interface of the radio access technology to a standard interface used by the controller.

For an embodiment, the request from the radio access technology for the radio of the plurality of radios is based on a type of data to be transmitted, wherein the type of data includes at least control data and user data. For an embodiment, the request from the radio access technology changes as a function of the type of data transmitted (for example, control versus user data). For an embodiment, the request from the radio access technology includes switching between wide beams for control data and narrow beams for user data. As will be described, for an embodiment, a switch from a wide beam to a narrow beam can be interpreted as two different radios or configuring a single radio differently.

For an embodiment, the request from the radio access technology for the radio of the plurality of radios is based on transmission (downlink) and reception (uplink) request for wireless communication through the radio. For an embodiment, the radio requests by the radio access technology changes as a function of uplink versus downlink requests.

For an embodiment, the request from the radio access technology for the radio of the plurality of radios is based on a signal strength of wireless devices connected to the plurality of radios. For an embodiment, the radio requested by the radio access technology changes as a function of signal strength with connected devices.

For an embodiment, the request from the radio access technology for the radio of the plurality of radios is based on a location of a device the radio is to wirelessly communicate with, and/or a coverage area of the radio. For an embodiment, the radio requested by the radio access technology changes as a function of the location of the connected device and/or the coverage area of the radio.

For an embodiment, the radios allocated by the controller changes as a function of the temporal capabilities of the radios. That is, different radios may have different coverage at different times. Accordingly, the radio allocated may change according to the coverage available at the different times.

For at least some embodiments, the radio access technology is one of a plurality of radio access technologies. Further, the controller receives requests from each of the plurality of the radio access technologies for a radio of the plurality of radios on a per frame basis. Further, the controller allocates and connects a one of a plurality of radios that satisfies specifications of each request of the plurality of radio access technologies on the per frame basis.

At least some embodiments further include multiplexing between connections of multiple of the plurality of radio access technologies to a single one of the plurality of radios. As previously stated, the multiplexing may be facilitated by one or more of various multiplexing configurations including FDMA, TDMA, SDMA, PDMA, etc.

For at least some embodiments, the allocating and connecting, by the controller, the one of the plurality of radios that satisfies specifications of each request of the plurality of radio access technologies includes the one of the plurality of radios transmitting data packets provided by the radio access technology. Further, for at least some embodiments, the allocating and connecting, by the controller, the one of the plurality of radios that satisfies specifications of each request of the plurality of radio access technologies includes the one of the plurality of radios receiving data packets which are provided to the radio access technology.

For at least some embodiments, the allocating and connecting, by the controller, further includes satisfying a policy control provided by a network management server. For an embodiment, the network manager creates policies for the allocating and connecting based upon network traffic & congestions. For example, for an embodiment, the policy of the network manager may include allocating and connecting the radio access technology to a single broad beam radio at night, and the allocating and connecting the radio access technology to several narrow beam radios at day. Further, for an embodiment, the policy of the network manage includes enabling/disabling radios available for allocation and connection based upon time, coverage, and spectral coordination/cohabitation.

For at least some embodiments, the controller setting a configuration of the plurality of radios includes configuring the plurality of radios to satisfying a policy control provided by a network management server. For an embodiment, the network manager sets a configuration of the plurality of radios based upon network traffic & congestions. For example, for an embodiment, the policy of the network manager may include the controller setting a configuration of the plurality of radios to a single broad beam radio at night, and the setting a configuration of the plurality of radios to several narrow beam radios at day. Further, for an embodiment, the policy of the network manage includes enabling/disabling radios available for allocation and connection based upon time, coverage, and spectral coordination/cohabitation.

Figure 7:
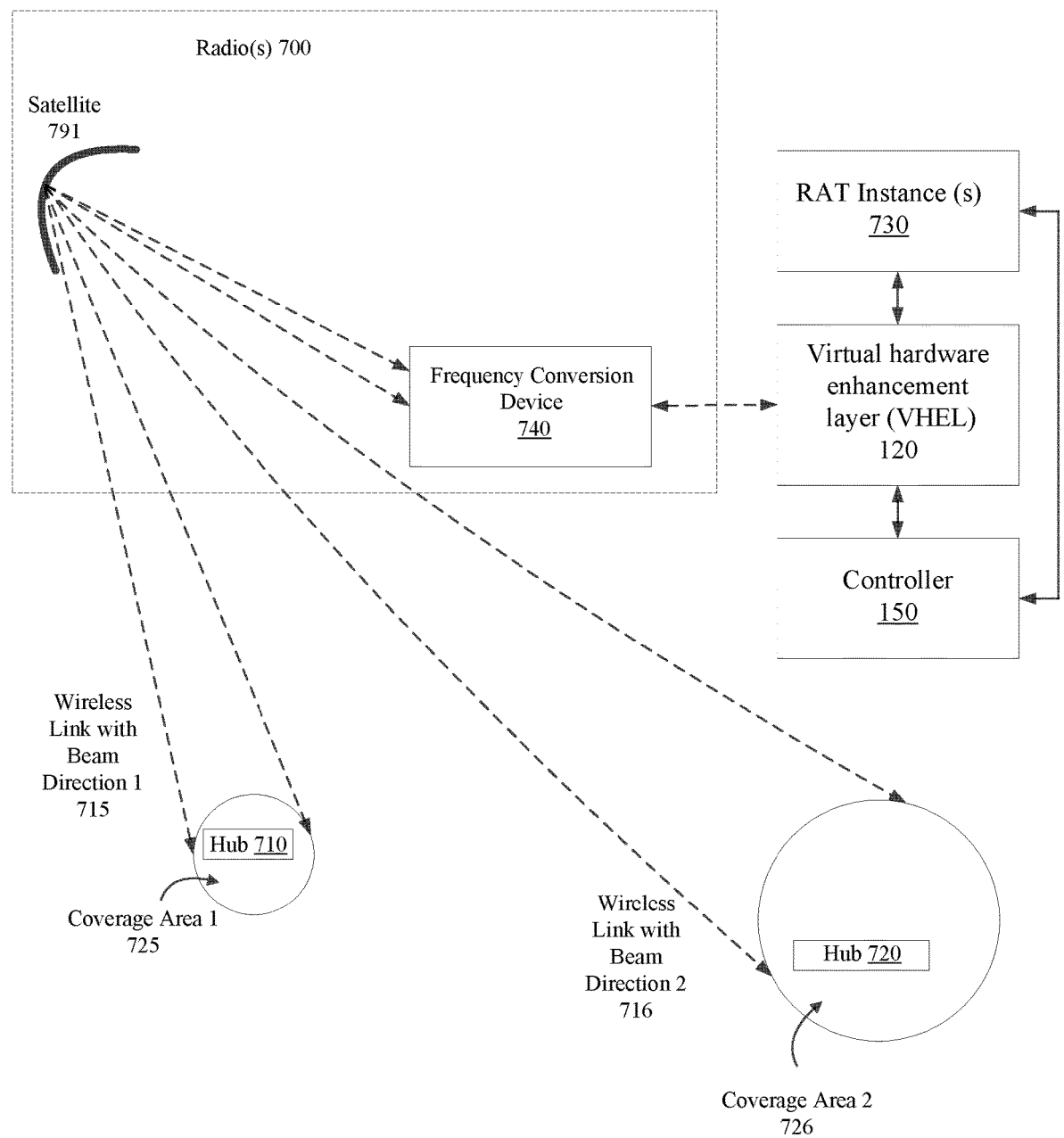
FIG. 7 shows a radio frequency (RF) virtualization architecture adapted for at least satellite communication, according to an embodiment.

FIG. 7 shows a radio frequency (RF) virtualization architecture adapted for at least satellite communication, according to an embodiment. For this embodiment, at least one of the radios 700 includes a frequency conversion device 740 communicating with Hubs 710, 720 through a satellite 791. For an embodiment, the frequency conversion device 740 operates to receive a baseband communication signal that is frequency upconverted before being transmitted to a hub 710, 720 through the satellite 791, and further, receives a wireless communication signal from at least one of the hubs 710, 720, frequency down-converts the received wireless communication signal to a baseband communication signal. For at least some embodiments, the hubs 710, 720 are wireless devices that operates to sense or receive sensed information from sensors, and communicate the sensed information through the satellite 791, the frequency conversion device 740, through the VHEL 120, to one or more of the RAT instances 730.

For an embodiment, the radio(s) formed by the frequency conversion device 740 and the satellite 791 includes multiple antennas located at the satellite 791, and accordingly, wireless links 715, 716 formed by the multiple antennas of the satellite 791 can include beamforming. The beamformed wireless signals of the links 715, 716 focus the electromagnetic energy of the wireless links 715, 716 over coverage areas, such as, coverage areal 725 and coverage area 2 726. It is to be observed that the two different wireless links 715, 716 have two different beam directions and have two different coverage areas 725, 726. Different instances of RATs 730 can be matched with the different radio configurations of radios 700 formed by the different beamforming selections. For an embodiment, different beam directions and/or different coverage area can define different selectable radios 700. That is, a first radio access technology can be selectively matched to a first beam direction and a second radio access technology can be selectively matched to a second beam direction. Further, the first radio access technology can be selectively matched to a first beam coverage area and a second radio access technology can be selectively matched to a second beam coverage area.

For an embodiment, different RAT instances 730 can request for radio resources based on a current location of one of the Hubs 710, 720 and a location of the beam coverage area. Further, for an embodiment, a network manager (such as, network manager 790) operates to control at which time a particular beam can be enabled (of a radio 700), which influences the selection and time of allocation of radios 700 to the RAT instances 730.

For an embodiment, a location of a Hub 710, 720 can be determined based on the last signal received from Hub 710, 720. If the last location of the hub is not available, then the Hub location is determined by other means.

For an embodiment, the location of a Hub can be shared between different RAT instances when available. If hub moves from one coverage area to another coverage area, the Hub connects to a different RAT instance, wherein the different RAT instance was assigned to the same or a different radio.

For an embodiment, communication occurs between RAT instances. For example, different RATs can share network related information (network characteristics, congestion, etc.) which can help RAT in requesting radio resources as well as selecting control parameters for radio (for example, MCS, frame scheduling, IQ data format, etc. as shown in FIG. 5).

For an embodiment, when a RAT is overloaded with data traffic, the controller 150 can help in balancing the radio resources assigned to the RAT and divert data traffic to other lightly loaded RAT instances. Sharing the information between RATs can influence the request of the RAT which therefore can influence the balancing provided by the controller.

Although specific embodiments have been described and illustrated, the embodiments are not to be limited to the specific forms or arrangements of parts so described and illustrated. The described embodiments are to only be limited by the claims.

What is claimed:

1. A method, comprising:
    receiving, by a controller, a standard set of interfaces and capabilities from a plurality of radios through an abstraction layer, wherein the abstraction layer provides an interface to connect a radio access technology to a corresponding one of the plurality of radios, wherein at least one the plurality of radios includes a frequency conversion device communicating with wireless devices through a satellite, wherein the frequency conversion device operates to receive a baseband communication signal that is frequency upconverted before being transmitted through a wireless downlink to a wireless device through the satellite, and further operates to receive a wireless communication signal through a wireless uplink from at least one of the wireless devices, and frequency down-converts the received wireless communication signal to a baseband communication signal;

receiving, by the controller, a request from the radio access technology for a radio of the plurality of radios; and allocating and connecting, by the controller, a one of a plurality of radios that satisfies specifications of the request of the radio access technology, wherein the one of the plurality of radios that is allocated and connected to the radio access technology changes over time based at least on a current location of one or more of the wireless devices that the one of the plurality of radios is communicating with;

wherein a network manager controls timing of enablement of beams formed by multiple antennas of the satellite associated with the one of the radios that is allocated and connected to the radio access technology based on the current location of the wireless devices, locations of coverage areas of the beams, and directions of the beams;

wherein a VHEL (virtual hardware enhancement layer) server resynchronizes a timing of transmit and received frames to account for different propagation delays of different RF (radio frequency) path lengths of different of the radios, wherein organizes receive data back into frames that the radio access technology is able to process, and wherein the different path lengths include the enabled beams formed by the multiple antennas of the satellite.

2. The method of claim 1, wherein the request from the radio access technology for the radio of the plurality of radios occurs once per frame, wherein the frame is defined by a frame structure of wireless communication transmitted and received by the plurality of radios.

3. The method of claim 1, wherein the allocating and connecting, by the controller, the one of a plurality of radios that satisfies specifications of the request of the radio access technology changes from one frame to a next frame.

4. The method of claim 1, wherein the controller sets a configuration of the plurality of radios.

5. The method of claim 1, wherein the request from the radio access technology for the radio of the plurality of radios is based on transmission (downlink) and reception (uplink) request for wireless communication through the radio.

6. The method of claim 1, wherein the request from the radio access technology for the radio of the plurality of radios is based on a signal strength of wireless devices connected to the plurality of radios.

7. The method of claim 1, wherein the request from the radio access technology for the radio of the plurality of radios is based on a location of a device the radio is to wirelessly communicate with, and a coverage area of the radio.

8. The method of claim 1, wherein the radio access technology is one of a plurality of radio access technologies, and further comprising: receiving, by the controller, requests from each of the plurality of the radio access technologies for a radio of the plurality of radios on a per frame basis; and allocating and connecting, by the controller, a one of a plurality of radios that satisfies specifications of each request of the plurality of radio access technologies on the per frame basis.

9. The method of claim 8, further comprising multiplexing between connections of multiple of the plurality of radio access technologies to a single one of the plurality of radios.

10. The method of claim 1, wherein allocating and connecting, by the controller, the one of the plurality of radios that satisfies specifications of each request of the plurality of radio access technologies includes the one of the plurality of radios transmitting data packets provided by the radio access technology.

11. The method of claim 1, wherein allocating and connecting, by the controller, the one of the plurality of radios that satisfies specifications of each request of the plurality of radio access technologies includes the one of the plurality of radios receiving data packets which are provided to the radio access technology.

12. The method of claim 1, wherein the allocating and connecting, by the controller, further includes satisfying a policy control provided by a network management server.

13. The method of claim 4, wherein the controller sets a configuration of the plurality of radios comprises configuring the plurality of radios to satisfying a policy control provided by a network management server.

14. A radio frequency (RF) virtualization system, comprising:
a radio access technology;
a plurality of radios;
an abstraction layer network;
a controller, the controller operating to:
receive a standard set of interfaces and capabilities from a plurality of radios through the abstraction layer network, wherein the abstraction layer provides an interface to connect the radio access technology to a corresponding one of the plurality of radios, wherein at least one the plurality of radios includes a frequency conversion device communicating with wireless devices through a satellite, wherein the frequency conversion device operates to receive a baseband communication signal that is frequency upconverted before being transmitted through a wireless downlink to a wireless device through the satellite, and further operates to receive a wireless communication signal through a wireless uplink from at least one of the wireless devices, and frequency down-converts the received wireless communication signal to a baseband communication signal;
a request from the radio access technology for a radio of the plurality of radios; and
allocate and connect a one of a plurality of radios that satisfies specifications of the request of the radio access technology, wherein the one of the plurality of radios that is allocated and connected to the radio access technology changes over time based at least on a current location of one or more of the wireless devices that the one of the plurality of radios is communicating with;
wherein a network manager controls timing of enablement of beams formed by multiple antennas of the satellite associated with the one of the radios that is allocated and connected to the radio access technology based on the current location of the wireless devices, locations of coverage areas of the beams, and directions of the beams;
wherein a VHEL (virtual hardware enhancement layer) server resynchronizes a timing of transmit and received frames to account for different propagation delays of different RF (radio frequency) path lengths of different of the radios, wherein the resynchronization organizes receive data back into frames that the ratio access technology is able to process, and wherein the different path lengths include the enabled beams formed by the multiple antennas of the satellite.

15. The system of claim 14, wherein the controller receives the standard set of interfaces and capabilities of the plurality of radios from a controller of the abstraction layer network.

16. The system of claim 14, wherein the allocating and connecting the one of a plurality of radios that satisfies specifications of the request of the radio access technology changes from one frame to a next frame.

17. The system of claim 14, wherein the radio access technology is one of a plurality of radio access technologies, wherein the controller further operates to: receive requests from each of the plurality of the radio access technologies for a radio of the plurality of radios on a per frame basis; and allocating and connecting, by the controller, a one of a plurality of radios that satisfies specifications of each request of the plurality of radio access technologies on the per frame basis.

18. The system of claim 17, further comprising multiplexing between connections of multiple of the plurality of radio access technologies to a single one of the plurality of radios.

* * * * *